United States Patent
Moscato et al.

(10) Patent No.: US 6,335,978 B1
(45) Date of Patent: Jan. 1, 2002

(54) VARIABLE PRINTING SYSTEM AND METHOD WITH OPTICAL FEEDBACK

(75) Inventors: Anthony Moscato, North Tonawanda; Michael A. Graziano, Grand Island; Steven R. Bridon, West Seneca; Timothy D. Collins, Grand Island; Anthony B. DeJoseph, East Amherst, all of NY (US)

(73) Assignee: Moore North America, Inc., Grand Island, NY (US)

( * ) Notice: Subject to any disclaimer, the term of this patent is extended or adjusted under 35 U.S.C. 154(b) by 0 days.

(21) Appl. No.: 09/246,736

(22) Filed: Feb. 9, 1999

(51) Int. Cl.⁷ .................................................. G06K 9/00
(52) U.S. Cl. ........................ 382/112; 382/218; 356/430; 250/559.07
(58) Field of Search ................................ 382/112, 190, 382/224; 358/1.12, 1.15, 1.16, 1.17, 515, 505; 704/3; 345/418; 356/429, 430; 550/559.05–559.07, 559.44

(56) References Cited

U.S. PATENT DOCUMENTS

| | | | |
|---|---|---|---|
| 4,328,504 A | | 5/1982 | Weber et al. |
| 4,449,052 A | | 5/1984 | Krieg |
| 4,561,103 A | | 12/1985 | Horiguchi et al. |
| 4,685,139 A | * | 8/1987 | Masuda et al. ............. 382/112 |
| 4,975,971 A | | 12/1990 | Ohnishi |
| 5,058,175 A | | 10/1991 | Aso |
| 5,125,037 A | * | 6/1992 | Lehtonen et al. ........... 382/112 |
| 5,144,566 A | * | 9/1992 | Anderson et al. ........... 382/112 |
| 5,235,652 A | * | 8/1993 | Nally ........................... 382/112 |
| 5,384,859 A | | 1/1995 | Bolza-Schunemann et al. |
| 5,394,520 A | * | 2/1995 | Hall ............................. 345/632 |
| 5,404,020 A | | 4/1995 | Cobbs |
| 5,471,309 A | | 11/1995 | Bolza-Schunemann |
| 5,533,453 A | | 7/1996 | Wolfberg et al. |
| 5,535,313 A | * | 7/1996 | Schwab ....................... 345/418 |
| 5,544,045 A | * | 8/1996 | Garland et al. ................ 704/3 |
| 5,587,728 A | | 12/1996 | Edgar |
| 5,600,732 A | | 2/1997 | Ott et al. |
| 5,625,703 A | * | 4/1997 | Okuda et al. ............... 382/112 |
| 5,923,824 A | * | 7/1999 | Yokomizo .................... 358/1.9 |
| 5,995,719 A | * | 11/1999 | Bourdead'hui et al. .... 358/1.12 |
| 5,999,636 A | * | 12/1999 | Juang .......................... 382/112 |
| 5,999,649 A | * | 12/1999 | Nicholson et al. .......... 382/190 |

FOREIGN PATENT DOCUMENTS

| | | |
|---|---|---|
| EP | 0 773 513 A | 5/1997 |
| WO | WO 96/19352 | 6/1996 |
| WO | WO 97/40987 | 11/1997 |
| WO | WO 98/32096 | 7/1998 |

\* cited by examiner

Primary Examiner—Matthew C. Bella
Assistant Examiner—Gregory Desire
(74) Attorney, Agent, or Firm—Nixon & Vanderhye

(57) ABSTRACT

A method and system for verifying the intended imaging produced by a printer allow this task to be accomplished in essentially real-time, and utilizing relatively inexpensive, and high speed (e.g. about 200 feet per minute or greater) components. A computer control commands a raster image processor (RIP) to generate electronic print data (e.g. a bitmap) that is sent to an electronic digital printer (such as an inkjet cartridge array) and also to a print monitor. The printer images the bitmap onto a web or sheet, then a linear digital photosensor (e.g. photodiode) array scans essentially every pixel across the width of the web or sheet image area and transmits the scanned data to the print monitor system, which compares it to the bitmap produced by the RIP. If there is some discrepancy (of any sort), a message is generated which is ultimately transmitted back to the computer control where it may be used to log defective documents (MAG) being produced, generate human recognizable indicia (such as a warning light or sound), or shut down the system components. A second linear photodiode array may be provided before the printer and the data from it sent to the print monitor system to be combined with the electronic bitmap and compared to the data from the first sensor to determine whether there is any deficiency.

31 Claims, 3 Drawing Sheets

VARIABLE PRINTING SYSTEM AND METHOD WITH OPTICAL FEEDBACK

BACKGROUND AND SUMMARY OF THE INVENTION

Conventionally electronic verification of variably printed data is accomplished utilizing digitizing cameras. For example such as shown in U.S. Pat. Nos. 4,685,139 and 5,384,859, a reference level for acceptability of imaged data is determined and stored in a computer, and sometimes long afterwards a digitizing camera views subsequently printed webs or sheets and compares the subsequent imaging to the reference data. While such a system can effectively determine whether the intended imaging produced by a printer has been applied to a web or sheet, such systems are slow (e.g. web or sheet speed of well less than 200 feet per minute), very expensive, and do not truly provide real time evaluation.

According to the present invention a method and system are provided for verifying the intended imaging produced by a printer in a substantially real-time, relatively inexpensive, and high speed (variable from 0 to X) manner. According to the invention, data to be printed is sent from a computer control to a raster image processor (RIP) which converts it to a bitmap. The bitmap is sent both to the printer and to a print monitor. The printer images the bitmap on a moving web or sheet (e.g. moving at the speed of about 200–300 feet per minute), and downstream of the printer a first sensor in the form of a linear photodiode array can scan substantially every pixel across the width of the web or sheet. The scanned area may be illuminated by a lamp. The scanned information is fed to the print monitor where it is compared to the bitmap. Also a second linear photodiode array may be provided before the printer and the data therefrom fed to the print monitor so that the combination of the bitmap and the data from the second sensor may be compared to the imaging scanned by the first scanner. If the print monitor determines that there is a significant discrepancy, that data is transmitted back to the computer control which then can be used to log bad forms, generate a human recognizable signal (such as a sound or warning light), or shut down the system. The system according to the present invention is relatively inexpensive, linear digital photosensor arrays (linear photodiode arrays) being much less expensive than digitizing cameras, and the system is essentially real-time because the sensed imaging is not compared to a reference determined at some perhaps long ago previous point in time, but rather is compared to a recently generated bitmap.

According to one aspect of the present invention there is provided a method of verifying the intended imaging produced by a printer, using a print monitor, comprising: (a) Generating electronic print data, e.g. a bitmap, for controlling the printer. (b) Substantially simultaneously supplying the electronic bitmap to the printer and to the print monitor. (c) Moving a web or sheet in a first direction to and past the printer. (d) Imaging the moving web or sheet with the printer as the web or sheet moves past the printer. (e) Scanning the web or sheet at a location past the printer to sense the imaging thereof in electronic format. And, (f) supplying the sensed imaging in electronic format from (e) to the print monitor and comparing it to the electronic bitmap supplied to the print monitor in (b).

In the invention (e) is typically practiced utilizing an opto-electronic array, e.g., a linear photodiode array. The web or sheet image area preferably has an effective width x, and the linear photodiode array has an effective length at least approximately equal to x, and (e) is practiced to scan substantially every pixel across the web or sheet image area width.

The method may further comprise (g) scanning the web or sheet at a location before the printer to sense the content of the pixels prior to imaging; (h) supplying the sensed data from (g) in electronic format to the print monitor; and practicing (f) to compare the data from (e) to the combination of the data from (h) and the electronic bitmap supplied to the print monitor in (b). Further the method may comprise (i) if the practice of (f) indicates a discrepancy of greater than a predetermined amount generating a signal indicative of the discrepancy. Still further the method may comprise (j), in response to the signal indicative of the discrepancy, logging information which can be used to identify a section of the web or sheet that should be inspected or removed, generating operator warning indicia, or terminating the continued practice of (a)–(d).

In the implementation of the invention (d) may be practiced by inkjet printing the web or sheet, such as utilizing a MICA 2 inkjet array such as disclosed in U.S. patent application Ser. No. 08/661,178 filed May 13, 1996 (the disclosure of which is hereby incorporated by reference herein). Also (a) through (f) may be practiced using business forms as the web or sheet, which may have non-variable printing while the inkjet printer prints variable data. Also, (a) through (f) may be practiced at a speed of web or sheet movement of greater than 200 fpm (e.g. about 200–300 fpm, or all smaller ranges within that broad range).

According to another aspect of the present invention an imaging system is provided comprising: A computer control (e.g. an XL Data System available from Moore U.S.A., Inc. of Lake Forest, Ill.). An electronic print data (e.g. bitmap) generator (e.g. an RIP such as a GRIP-SD+) connected to the computer control. A printer (e.g. a variable indicia printer such as an inkjet array). A print monitor. Means for moving a web or sheet to and past the printer in a given direction (e.g. any conventional rollers, feeders, guides, or like structures conventionally used for handling webs or sheets). A sensor which senses images on the web or sheet, the sensor located past the printer in the direction of web or sheet movement. The electronic print data generator connected to the printer and to the print monitor and supplying electronic print data to both the printer and the print monitor. The sensor connected to the print monitor. And, the print monitor comparing data from the sensor to data from the electronic print data generator to determine any significant discrepancy.

The print monitor is typically connected to the computer control to supply discrepancy information from the print monitor to the computer control. The sensor preferably comprises an opto-electronic array, e.g. a linear photodiode array which has an effective length at least approximately equal to one-sixth inch up to the effective width of the web or sheet image area to sense substantially every pixel; for example the sensor may comprise one or more 200–300 pixel linear photodiode array elements. A lamp (e.g. halogen) connected to a linear fiber optic illuminator may be provided, the illuminator positioned adjacent the sensor for illuminating the web or sheet adjacent the sensor.

The system may further comprise a second optical sensor positioned before the printer in the direction of web movement, the second sensor connected to the print monitor, the print monitor comparing data from the sensor to a combination of data from the electronic print data generator and the second sensor.

According to another aspect of the present invention an imaging system is provided comprising the following components: A printer. A print monitor. Means for moving a web or sheet to and past the printer in a given direction. A first sensor which senses images on the web or sheet, the first sensor located past the printer in the direction of web or sheet movement. An electronic print data generator connected to the printer and to the print monitor and supplying electronic print data to both the printer and the print monitor. A second sensor which senses images on the web or sheet prior to the web or sheet passing to the printer. The first and second sensors connected to the print monitor. And, the print monitor comparing data from the first sensor to data from the electronic print data generator and the second sensor combined to determine any significant discrepancy. The details of the components may be as described above.

It is the primary object of the present invention to provide a simple, cost-effective, accurate, and high speed method and system for verifying the intended imaging produced by a printer on a moving web or sheet. This and other objects of the invention will become clear from an inspection of the detailed description of the invention and from the appended claims.

DETAILED DESCRIPTION OF THE DRAWINGS

Figure 1:
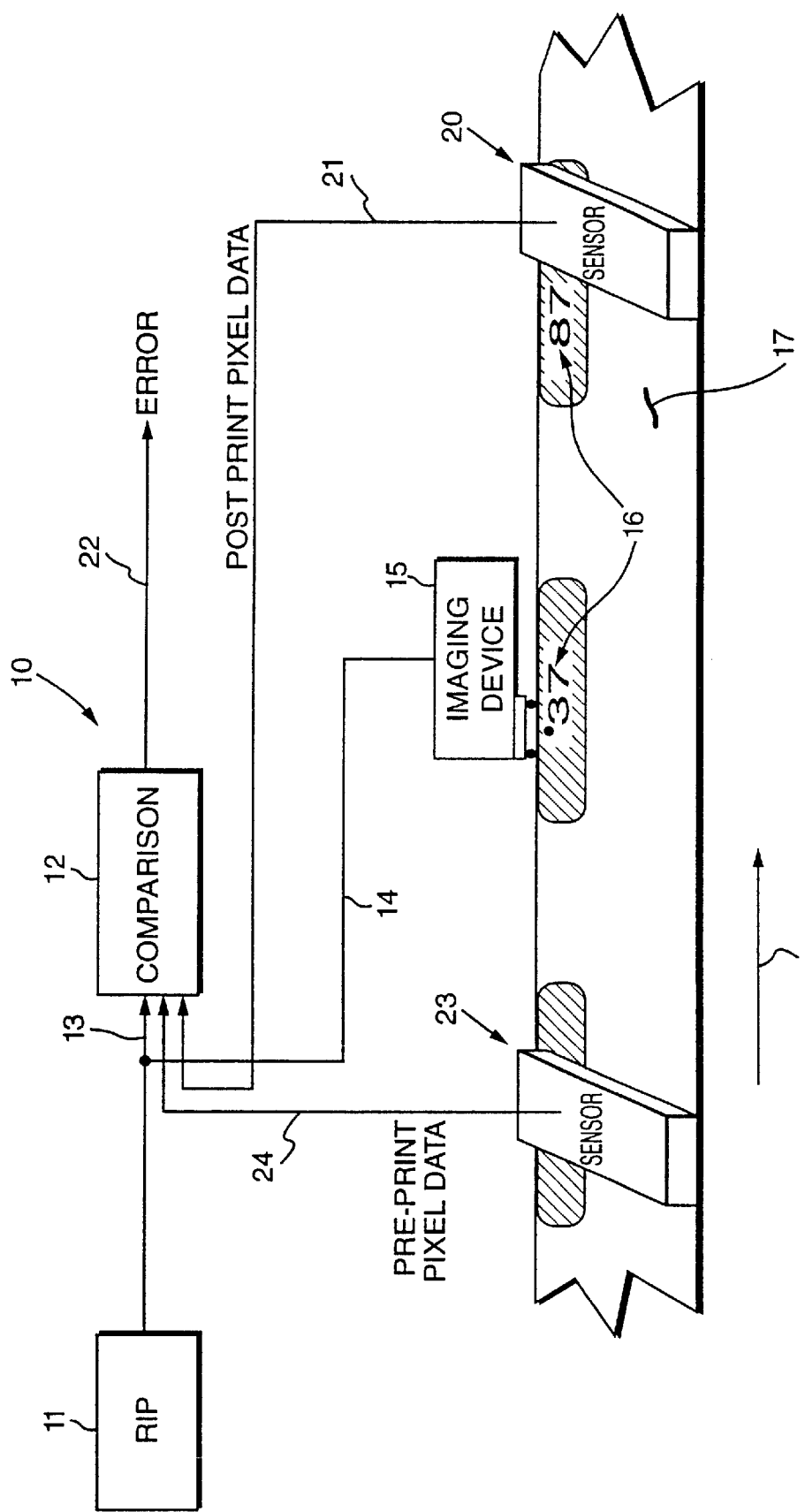
FIG. 1 is a box diagram indicating one embodiment of an exemplary system according to the present invention.

An exemplary imaging system, which verifies the intended imaging produced by a printer, is illustrated schematically by reference numeral 10 in FIG. 1. The electronic components of the system 10 include the raster image processor (RIP) 11, and comparison circuitry, which can compare electronic data to determine discrepancies, schematically illustrated by reference numeral 12. The RIP 11 provides imaging data via line 13 to the comparison circuitry 12, and also—via line 14 in FIG. 1—to a conventional imaging device 15, such as a conventional printer of almost any type which applies ink or toner in the form of the images illustrated schematically at 16 in FIG. 1 to a web or sheet (series of sheets) 17. FIG. 1 illustrates the web 17 moves in the direction 18, being moved in that direction by any conventional structures for effecting web movement, such as rollers, feeders, guides, etc.

The system 10 also comprises a first, preferably optical, sensor 20 which scans the web or sheet 17 at a location past the imaging device (e.g. electronic digital printer) 15 to sense the imaging thereof (such as the variable indicia 16 applied by the imaging device to the web or sheet 17) and to feed this post-print pixel data via line 21 to the comparison circuitry 12. The comparison circuitry 12 then compares the data supplied in line 13 from the RIP 11 to the data supplied via line 21 and if there is a discrepancy of more than a predetermined amount generates an electronic error signal—illustrated schematically at 22 in FIG. 1. The error signal 22 may then be used in any suitable way to correct the discrepancy, remove bad sheets or sections of the sheets or web 17, or the like.

In the embodiment illustrated in FIG. 1 a second optical sensor 23 is also provided prior to the imaging device 15 in the direction of web movement 18. The sensor 23 senses the status of optically viewable elements (such as non-variable indicia, or optical "noise") and in response generates pre-print pixel data which is transmitted by data line 24 to the comparison circuitry 12. When the second sensor 23 is utilized, the comparison circuitry evaluates the inputs from 13, 21, and 24 to see that the pre-print pixel data in 24 plus the image data in 13 is substantially equal to the post-print pixel data in 21, otherwise an error signal 22 is generated.

In the preferred embodiment of the invention, the sensors 20, 23 each comprise an opto-electronic array, such as linear digital photosensor arrays, also known as linear photodiode arrays, such as one or more 200–300 pixel linear photodiode arrays. For example each of the sensors 20, 23 may comprise one or more Texas Instruments 256 pixel linear photodiode arrays, with 400 dpi spaced pixels (which may be electronically scaled to 360 dpi if the imaging device 15 is a MICA 2 print cartridge, comprising a plurality of inkjet nozzles, such as shown in co-pending application Ser. No. 08/661,178 filed May 13, 1996). The web or sheet 17 typically has an effective width x and the linear photodiode arrays 20, 23 have an effective length approximately at least equal to x, so that the arrays 20, 23 sense substantially every pixel across the image area of the width of the sheet or web 17. In one exemplary embodiment a web 17 that is provided has a width (perpendicular to the direction of movement 18) of about twenty-three inches, and the sensing resolution by the photodiode arrays 20, 23 is about 360 dpi across the web. The sensing resolution may also be about 100 dpi–300 dpi along the web 17, to check from every third pixel to every pixel along the web direction of movement 18.

Figure 2:
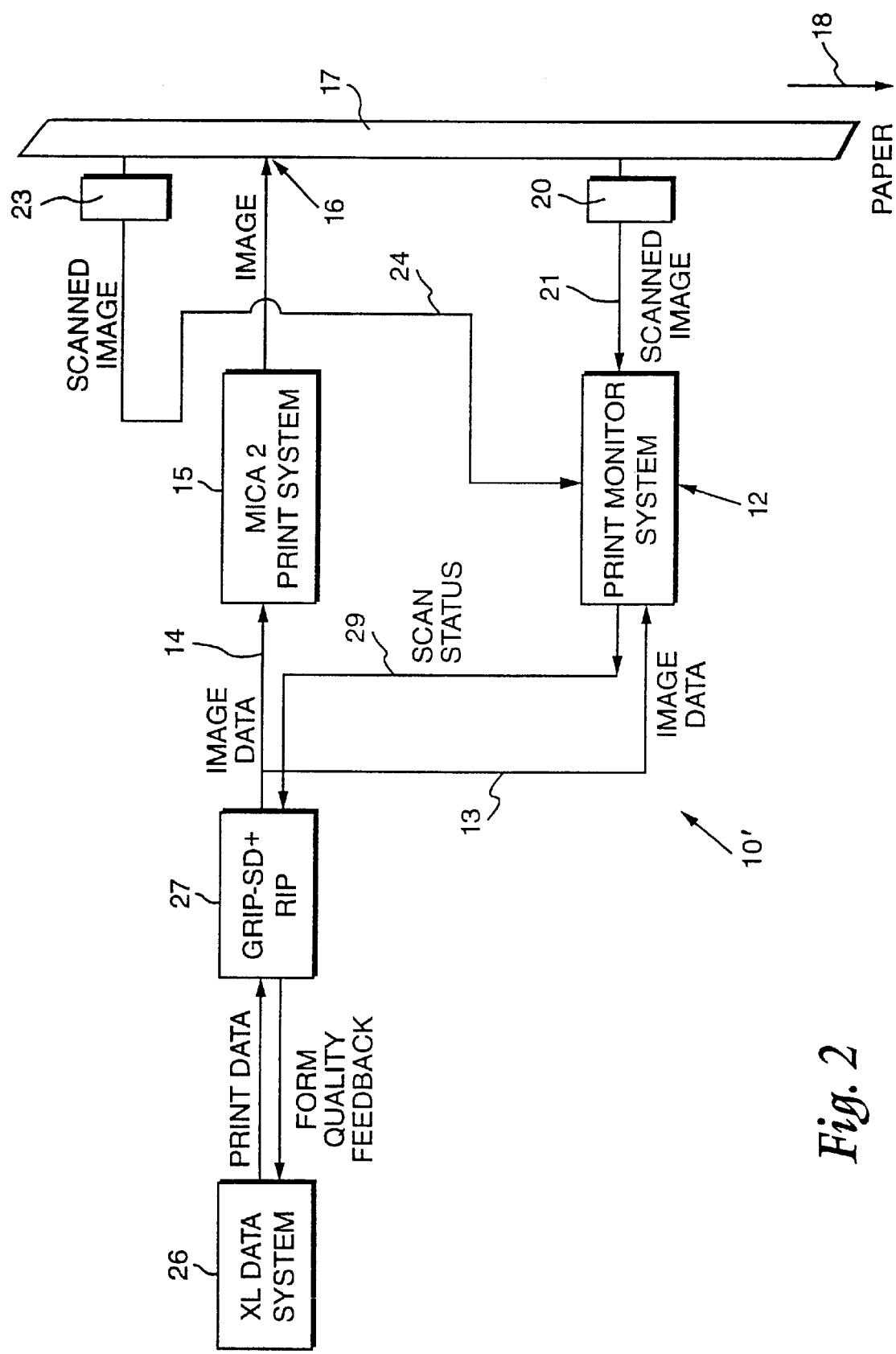
FIG. 2 is a box diagram indicating a modification of the system of FIG. 1.

FIG. 2 illustrates a system 10' which is a modification of the system of FIG. 1. FIG. 2 shows a common computer control 26, which may be an XL Data System available from Moore U.S.A., Inc. of Lake Forest, Ill. (and also illustrated in International Publication no. WO 96/19352 published Jun. 27, 1996). The computer control 26 provides the ultimate commands to image. The commands to image are transmitted to the special RIP 27 illustrated in FIG. 2. The special RIP illustrated at 27 in FIG. 2 is known as a GRIP-SD+ and is available from Moore U.S.A., Inc. of Lake Forest, Ill. The device 27 converts the print data from the computer control 26 into an electronic bitmap, which is then sent via line 13 to the comparison circuitry, namely print monitor 12, and via line 14 to the imaging device 15, in this case a MICA 2 print system. The print system 15 may comprise 16 inkjet cartridges per GRIP-SD+27.

The sensors 20, 23 (as described above) transmit the scanned images in electronic format to the print monitor 12 where the scanned images are compared to the bitmap produced by the GRIP-SD+27, or the bitmap and the pre-print pixel data transmitted via line 24. The result of the comparison by the print monitor 12 is transmitted to the GRIP-SD+27 via line 29, which generates a message to the computer control 26 where it may be used to log bad forms (that is electronically determine where sections of the web 17 or individual sheets should be destroyed or further inspected), generates operator warning indicia (such as a noise, flashing light, or any other conventional operator warning), or shuts down the entire system 10'.

Figure 3:
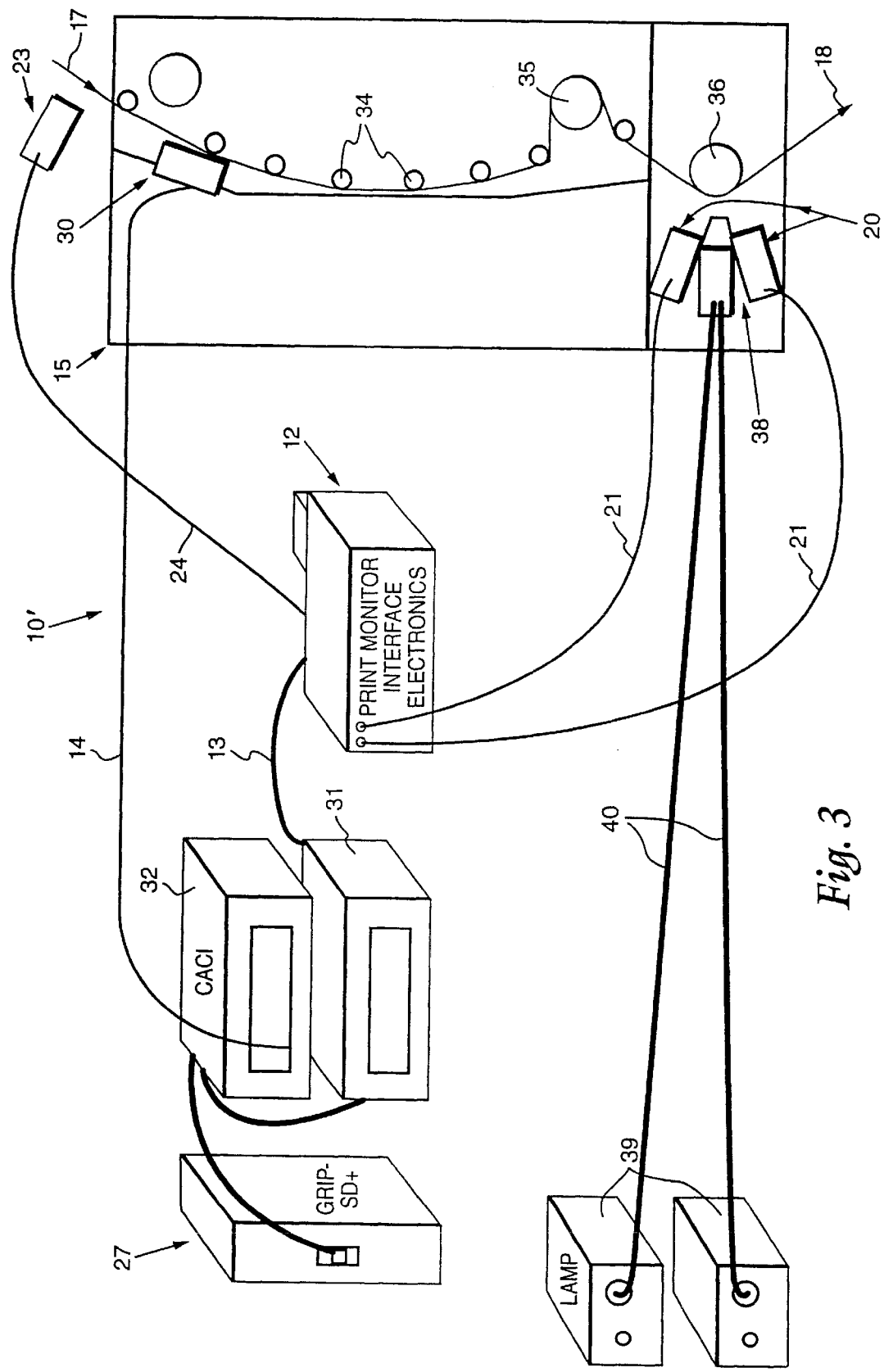
FIG. 3 is a schematic illustration of details of the system of FIG. 2.

FIG. 3 is simply a schematic illustration of one form of the embodiment of FIG. 2 can take. In this case the printer 15 is schematically illustrated as a MICA 2 printer, with one (of many) print cartridge thereof schematically illustrated by reference numeral 30, and conventional print controller units 31, 32 are shown connected to the GRIP-SD+27. Typically eight print cartridge cables 14 per print controller 32 are connected to the cartridges 30, while the print controllers 31 is illustrated connected by data cable 13 to the print monitor 12.

FIG. 3 illustrates conventional means for moving the web or sheet 17 past the print cartridges 30, such as the rollers 34, 35, and 36. It is to be understood, however, that the web or sheet moving means may comprise any suitable components or combination of components that are conventionally used for moving webs, such as drive rollers, idler rollers, web or sheet guides, sheet feeders, and the like.

FIG. 3 illustrates two individual Texas Instrument 256 pixel linear photodiode arrays 20 of a plurality of such arrays that comprise the sensor 20 positioned downstream of the cartridges 30 in the direction of web movement 18, and in this case where the web 17 passes over the roller 16 so that the images thereon are highly visible. Also in order to facilitate accurate reading by the sensor 20 a light source head 38 is provided adjacent the sensor 20 for illuminating the web 17 adjacent the sensor 20. The light source head 38 may be connected up to one or more (e.g. halogen) lamps 39 by fiber optics 40, the fiber optics 40 and head 38 comprising a linear fiber optic illuminator. For example the fiber optic bundles 40 are round, and are flattened at the light transmission end/head 38 and concentrated by a conventional lens (not shown) in the head 38 to form a line of light which illuminates the web or sheet 17 at the roller 36, and to which the photodiode arrays of the sensor 20 are directed. A similar illuminator may be provided for the second sensor 23 (if utilized). The individual components of the sensor 20 may be specifically related to an individual cartridge 30 of the ink jet printer 15.

The system 10, 10' according to the invention is used in a method of verifying the intended imaging 16 produced by a printer 15 using a print monitor 12. The method comprises (a) Generating an electronic bitmap using an RIP 11, such as the GRIP-SD+27, for controlling the printer 15. (b) Substantially simultaneously supplying the electronic bitmap to the printer 15 and print monitor 12 via 14,13, respectively. (c) Moving the web or sheet 17 in a first direction 18 to and past the printer 15 (preferably at high speed, that is greater than 200 fpm, e.g. about 200–300 fpm and all smaller ranges within that broad range). (d) Imaging the moving web or sheet 17 with the imaging device 15, as by applying toner or ink to form the images 16. (e) Scanning the web or sheet 17 at a location past the printer (where first sensor 20 is located) to sense the imaging of the web 17 in electronic format. And, (f) supplying the sensed imaging in electronic format (through 21) from (e) to the print monitor 12 and comparing it to the electronic bitmap supplied to the print monitor via 13.

The method may also optionally comprise (g) scanning the web or sheet 17 at a location before the printer 15 (e.g. at the location of the sensor 23) to sense the content of the pixels of the web or sheet 17 prior to imaging; (h) supplying the sensed data from (g) in electronic format to the print monitor 12 (via 24); and practicing (f) to, in the print monitor 12, compare the data from (e) to the combination of the data from (h) and the electronic bitmap supplied to the print monitor 12 in (b). The method may also further comprise (i) if the practice of (f) indicates a discrepancy of greater than a predetermined amount, generating a signal (e.g. 22 or 29) indicative of the discrepancy. Then the method may also comprise (j) in response to the signal generated in (i), logging (e.g. with computer control 26) information which can be used to identify a section of the web 17 or a sheet 17 that should be inspected or removed, generating operator warning indicia (such as the computer control 26 activating an audio or visual indicator), or terminating the continued practice of (a)–(d).

In the method, (a)–(f) are typically practiced using documents as the web or sheet 17, and (d) is typically practiced by inkjet printing the web or sheet 17 with variable indicia 16. Non-variable indicia may already be provided on the web or sheet 17 prior to the imaging device 15.

The method according to the invention is not only high speed because of the speed of movement of the web or sheet 17, but also because the web direction change time and sensor setup time are both small. For example utilizing linear photodiode arrays as the sensors 20, 23, the sensors (when used in association with a MICA 2 printer 15) are aligned coarsely by hand to each movable cartridge 30, and then the system electronically finds each cartridge 30's printing area within each element of sensor 20's length, the sensor setup time typically being about five minutes. The web direction change time also is only about five minutes. The sensor and light head mounts 20, 38 can be moved below or above the cartridges 30 depending upon which is the web exit, and hand removable fasteners may be utilized for changing the position in a short period of time.

A number of other features may also be provided according to the invention. For example the light level provided by the head 38 may be adjusted for a minimum level of reflection from the paper web or sheet 17. The light level to which the head 38 is adjusted is a minimum level for all sensors 20 to operate properly, but allows for optimized signal to noise levels when using colored inks. The light level is detected, for the purposes of adjustment, utilizing the sensors (e.g. linear digital photosensor arrays) and cells, and may be adjusted automatically.

Also, automatic registration may be provided of a cartridge 30 to sensor 20 positioning in both the X and Y directions. That is the mechanical offset of a sensor 20 to a print cartridge 30 may be electronically detected using predefined conventional patterns and pattern recognition algorithms. The X direction pattern is the same for each raster and the position the pattern is found is designated as the "X offset". The Y direction pattern is scaled across a set number of rasters with the size decreasing for each consecutive raster. The difference ($\Delta$) of size between the scanned image and the expected image provides the mechanical tolerance between the sensor 20 and the print cartridge 30.

The system 10' may also use statistical sampling to provide a print quality value. Comparison results may be tabulated to provide a percentage value of printing that is correct over a predetermined sample size. The sample set may be restricted to raster data that contains printed pixels. This feature allows the user to select acceptable print quality in a simple manner. Statistical sampling per se according to this aspect of the invention is conventional.

The system 10' may also provide increased sensitivity for infrequently printed pixels. That is if the sensor 20 is partitioned into multiple virtual sensors, conventional statistical sampling may be performed for each virtual sensor, with the sample set restricted to raster data that contains printed pixels in that partition. This allows for detection of subtle errors without increased false errors.

It will thus be seen that according to the present invention a method and system are provided which allow the accurate, fast, and relatively inexpensive verification of intended imaging produced by a printer, in a substantially real-time manner. While the invention has been herein shown and described in what is presently conceived to be the most practical and preferred embodiment it will be apparent to those of ordinary skill in the art that many modifications may be made thereof within the scope of the invention, which scope is to be accorded the broadest interpretation of the appended claims so as to encompass all equivalent methods and systems.

What is claimed is:

1. A method of verifying the intended imaging produced by a printer, using a print monitor, comprising:
   (a) generating electronic print data for controlling the printer;
   (b) substantially simultaneously supplying the electronic print data to the printer and to the print monitor;
   (c) moving a web or sheet in a first direction to and past the printer;
   (d) imaging the moving web or sheet with the printer as the web or sheet moves past the printer;
   (e) scanning the web or sheet at a location past the printer to sense the imaging thereof in electronic format;
   (f) supplying the sensed imaging in electronic format from (e) to the print monitor for electronically comparing it to the electronic print data supplied to the print monitor in (b); and
   (g) in response to (f) identifying a section of the web or sheet that should be inspected or removed.

2. A method as recited in claim 1 wherein (e) is practiced using an opto-electronic array.

3. A method as recited in claim 2 wherein the web or sheet image area has an effective width x, and wherein the opto-electronic sensor array has an effective length at least approximately equal to x and (e) is practiced to scan substantially every pixel across the web or sheet width image area.

4. A method as recited in claim 3 further comprising (g) scanning the web or sheet prior to it reaching the printer; (h) supplying the sensed data from (g) in electronic format to the print monitor; and practicing (f) to compare the data from (e) to the combination of the data from (h) and the electronic print data supplied to the print monitor in (b).

5. A method as recited in claim 4 further comprising (i) generating a signal indicative of the discrepancy if the practice of (f) indicates a discrepancy of greater than a predetermined amount.

6. A method as recited in claim 5 further comprising (j) logging information which can be used to identify a section of the web or sheet that should be inspected or removed, generating operator warning indicia, or terminating the continued practice of (a)–(d) in response to the signal indicative of the discrepancy.

7. A method as recited in claim 1 further comprising (g) scanning the web or sheet prior to it reaching the printer; (h) supplying the sensed data from (g) in electronic format to the print monitor; and practicing (f) to compare the data from (e) to the combination of the data from (h) and the electronic print data supplied to the print monitor in (b).

8. A method as recited in claim 1 further comprising (i) if the practice of (f) indicates a discrepancy of greater than a predetermined amount generating a signal indicative of the discrepancy.

9. A method as recited in claim 8 further comprising (j), in response to the signal indicative of the discrepancy, logging information which can be used to identify a section of the web or a sheet that should be inspected or removed in the practice of (g).

10. A method as recited in claim 8 further comprising (j), in response to the signal indicative of the discrepancy, generating operator warning indicia, or terminating the continued practice of (a)–(d).

11. A method as recited in claim 1 wherein (d) is practiced by ink jet printing the web or sheet with variable indicia.

12. A method as recited in claim 1 wherein (a)–(f) are practiced using documents as the web or sheets.

13. A method as recited in claim 1 wherein (a)–(f) are practiced at a speed of web or sheet movement of greater than about 200 fpm.

14. An imaging system comprising:
   a computer control;
   an electronic print data generator connected to said computer control;
   a printer;
   a print monitor;
   means for moving a web or sheet to and past said printer in a given direction;
   an opto-electronic sensor array sensor which senses images on the web or sheet, said sensor located past said printer in the direction of web or sheet movement;
   said electronic print data generator connected to said printer and to said print monitor and supplying electronic print data to both said printer and said print monitor;
   said sensor connected to said print monitor;
   said print monitor electronically comparing data from said sensor to data from said electronic print data generator to determine any significant discrepancy; and
   wherein said web or sheet has an effective image area width x, and wherein said opto-electronic sensor array has an effective length at least approximately equal to x so that substantially every pixel of said web or sheet image area can be sensed by said opto-electronic sensor array.

15. An imaging system as recited in claim 14 wherein said print monitor is connected to said computer control to supply discrepancy information from said print monitor to said computer control.

16. An imaging system as recited in claim 14 wherein said sensor comprises at least one 200–300 pixel linear photodiode array.

17. An imaging system as recited in claim 14 further comprising a lamp connected to a linear fiber optic illuminator, said illuminator positioned adjacent said sensor for illuminating said web or sheet adjacent said sensor.

18. An imaging system as recited in claim 14 wherein said electronic print data generator comprises a GRIP-SD+.

19. An imaging system as recited in claim 18 wherein said computer control comprises an XL Data System.

20. An imaging system as recited in claim 14 further comprising a second optical sensor positioned before said printer in the direction of web movement, said second sensor connected to said print monitor, said print monitor comparing data from said sensor to a combination of data from said electronic print data generator and said second sensor.

21. An imaging system as recited in claim 14 wherein said printer comprises an inkjet printer having an array of inkjet cartridges.

22. An imaging system comprising:
   a computer control;
   an electronic print data generator connected to said computer control;
   a printer;
   a print monitor;
   means for moving a web or sheet to and past said printer in a given direction;

a first sensor which senses images on the web or sheet, said first sensor located past said printer in the direction of web or sheet movement;

an electronic print data generator connected to said printer and to said print monitor and supplying electronic print data to both said printer and said print monitor;

a second sensor which senses images on said web or sheet prior to said web or sheet passing to said printer;

said first and second sensors connected to said print monitor; and said print monitor electronically comparing data from said first sensor to data from said electronic print data generator and said second sensor combined to determine any significant discrepancy.

23. An imaging system as recited in claim 20 wherein said first and second sensors both comprise linear photodiode arrays.

24. An imaging system as recited in claim 23 wherein said web or sheet has an image area effective width x, and wherein each said photodiode arrays has an effective length at least approximately equal to x so that substantially every pixel of said web or sheet image area is sensed by said photodiode arrays.

25. An imaging system as recited in claim 23 wherein said sensors each comprise at least one 200–300 pixel linear photodiode array.

26. An imaging system as recited in claim 20 further comprising a lamp connected to a linear fiber optic illuminator, said illuminator positioned adjacent said first sensor for illuminating said web or sheet adjacent said first sensor.

27. A method of verifying the intended imaging produced by a printer, using a print monitor, and a sensor comprising:

(a) generating electronic print data for controlling the printer;

(b) substantially simultaneously supplying the electronic print data to the printer and to the print monitor;

(c) moving a web or sheet in a first direction to and past the printer;

(d) imaging the moving web or sheet with the printer as the web or sheet moves past the printer;

(e) with the sensor scanning the web or sheet at a location past the printer to sense the imaging thereof in electronic format;

(f) supplying the sensed imaging in electronic format from (e) to the print monitor for electronically comparing it to the electronic print data supplied to the print monitor in (b); and (g) automatically adjusting registration of the printer to the sensor.

28. A method as recited in claim 27 wherein (g) is practiced to provide automated registration in both the first direction and a second direction substantially transverse to the first direction.

29. A method as recited in claim 27 further comprising (i) if the practice of (f) indicates a discrepancy of greater than a predetermined amount generating a signal indicative of the discrepancy.

30. A method as recited in claim 29 further comprising (j), in response to the signal indicative of the discrepancy, logging information which can be used to identify a section of the web or a sheet that should be inspected or removed.

31. An imaging system comprising:

a computer control;

an electronic print data generator connected to said computer control;

a printer;

a print monitor;

means for moving a web or sheet to and past said printer in a given direction;

an opto-electronic sensor array sensor which senses images on the web or sheet, said sensor located past said printer in the direction of web or sheet movement;

said electronic print data generator connected to said printer and to said print monitor and supplying electronic print data to both said printer and said print monitor;

said sensor connected to said print monitor;

said print monitor electronically comparing data from said sensor to data from said electronic print data generator to determine any significant discrepancy, and a lamp connected to a linear fiber optic illuminator, said illuminator positioned adjacent said sensor for illuminating said web or sheet adjacent said sensor.

* * * * *